C. W. TOMPKINS.
AUTOMOBILE WHEEL.
APPLICATION FILED SEPT. 16, 1910.
1,009,942.
Patented Nov. 28, 1911.
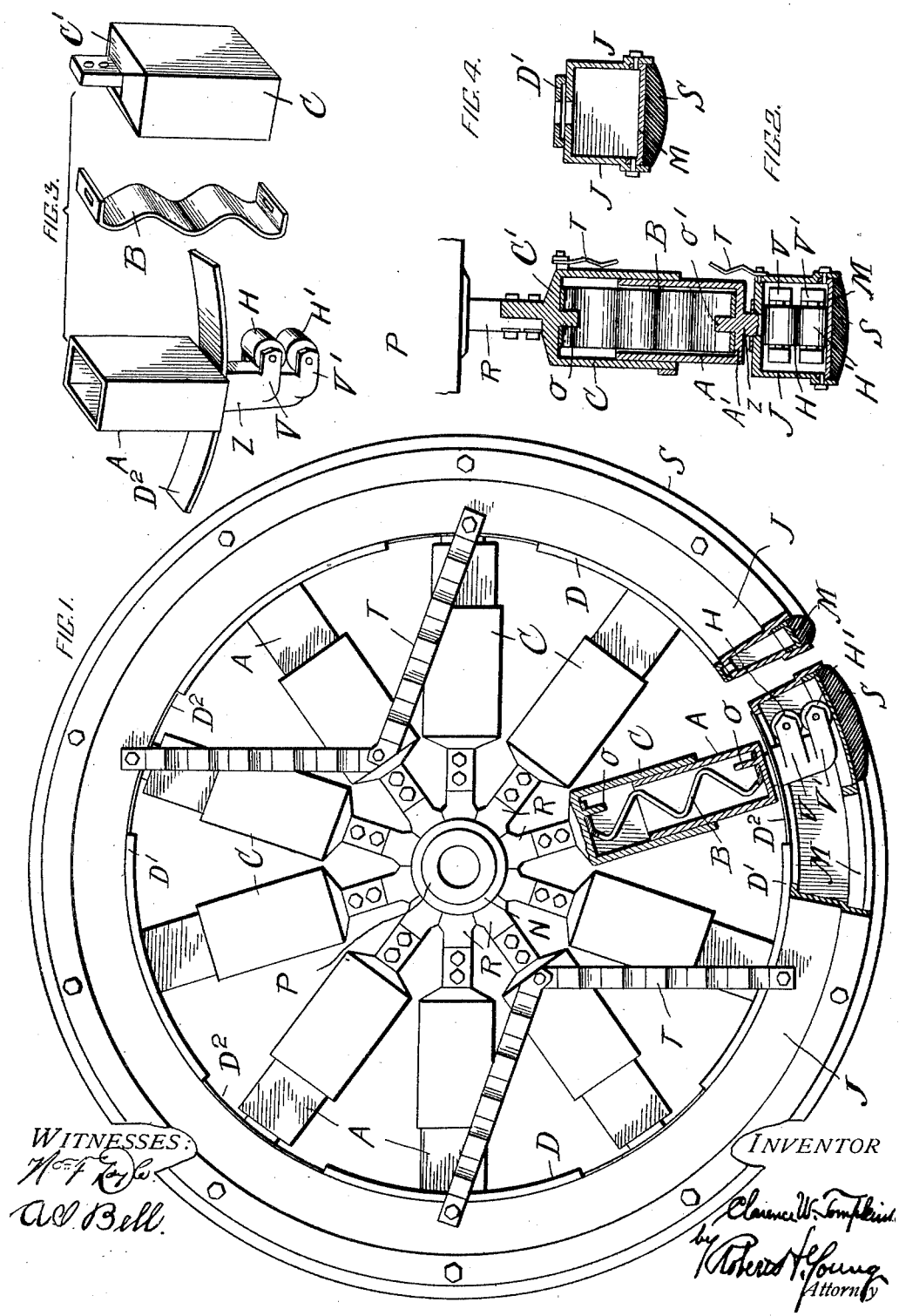

UNITED STATES PATENT OFFICE.

CLARENCE W. TOMPKINS, OF BROOKFIELD, MISSOURI.

AUTOMOBILE-WHEEL.

1,009,942.

Specification of Letters Patent.

Patented Nov. 28, 1911.

Application filed September 16, 1910. Serial No. 582,420.

*To all whom it may concern:*

Be it known that I, CLARENCE W. TOMPKINS, a citizen of the United States, residing at Brookfield, Linn county, Missouri, have invented a new and useful Automobile-Wheel, of which the following is a detailed description.

My invention relates to improvements in resilient vehicle wheels.

The object of my invention is to produce a wheel of said class having a spring cushion carried on the spokes thereof intermediate of the hub and rim adapted to absorb the vibration caused by travel over an irregular roadbed.

A further object of my invention is to provide telescoping cylinders on the spokes of a wheel housing a compressible spring adapted to resiliently sustain the weight of the vehicle, and for other purposes to be hereinafter described and more particularly pointed out in the claim.

In the accompanying drawings, in which like reference characters indicate similar parts, Figure 1 is a side view of my wheel showing a portion thereof in cross-section; Fig. 2 is a transverse sectional view of one of the spokes and outer rim; Fig. 3 is a detail perspective view of the telescoping cylinders and other parts of the resilient spokes of my invention, and Fig. 4 is a sectional view of a portion of the rim of my wheel.

Referring now to the drawings, P indicates the hub of my wheel and R the radial spokes of ordinary construction. Attached to the outer end of each spoke is a cylinder C, preferably rectangular in cross section, having the head C' closing the inner end, the outer end of which is adapted to receive the cylinder A which fits snugly inside cylinder C and extends substantially half way of its depth. Said cylinder A is closed at its outer end by the head A'. Within said telescoping cylinders is longitudinally carried the corrugated spring B, each end of which is turned laterally to parallel the heads of the cylinders and are provided with orifices properly positioned to fit on lugs o on the cylinder heads to secure said spring in position within said telescoping cylinders. It will be apparent that the tendency of said spring B is to press the inner cylinder outwardly to sustain the annular frame comprising the felly of my wheel hereinafter described, and as the said cylinders are air-tight, it will be appreciated that the air compressed therein will form an air cushion which assists the spring B in sustaining the weight of the wheel.

The outer ends of all the inner cylinders C assembled in my wheel structure are reinforced and held in regular radial position by the annular metallic band N which may be either brazed or otherwise fastened to each of said cylinders. The felly of my wheel is substantially U-shape in cross-section having the channel sides J, to the outer edges of which is bolted or otherwise secured the rim M, to which is suitably secured the tire S of any preferred material. On the outer end of the outer cylinder A and preferably cast integral therewith, is the arm Z which projects through suitably spaced slots in the inner periphery of the felly into the channel F thereof. Said arm is provided with two sets of brackets V and V' at substantially right angles to the arm. On each of said sets of brackets is mounted the rollers H and H' respectively, the faces of which contact with each other, and the outer roller H' bears upon the rim M and the inner roller H bears upon the inner face of the felly. It will be appreciated that said construction affords easy bearings for the ends of the telescoping spring supported cylinders when moving to compensate for the vibration of the wheel. On the inner periphery of said felly is secured the annular dust cover D comprising the overlapping and telescoping sections D' and D².

For the purpose of preventing the spokes and telescoping cylinders carried thereon from revolving on the rim M, I provide corrugated spring braces T secured on the inner cylinders C at one end and on the sides J of the felly at the opposite, as shown in Fig. 1 of the drawings.

I claim:

A resilient vehicle wheel comprising a hub, radial spokes, telescoping cylinders secured on the ends of the spokes, a corrugated spring carried within said cylinders secured at its opposite ends to the opposite telescoping cylinders, a channeled felly, roller bearings secured on the outer ends of said telescoping cylinders and carried in said channeled felly, said rollers contacting with the outer and inner rims of said felly, and resilient braces securing said felly against rotation on said rollers, substantially as described.

C. W. TOMPKINS.

Witnesses:
O. C. POTTER,
J. FRED PEERY.

Copies of this patent may be obtained for five cents each, by addressing the "Commissioner of Patents, Washington, D. C."